United States Patent [19]

Kawamura et al.

[11] Patent Number: 4,859,998
[45] Date of Patent: Aug. 22, 1989

[54] APPARATUS AND METHOD FOR DRIVING SIGNAL ELECTRODES FOR LIQUID CRYSTAL DISPLAY DEVICES

[76] Inventors: Masao Kawamura, 205 Daiichi-Kitajima-So, 4993 Yaho, Kunitachi-shi, Tokyo; Minoru Usui, 201 Satsuki-Corpo, 2-2-4, Asahi-cho, Akishima-shi, Tokyo, both of Japan

[21] Appl. No.: 207,020

[22] Filed: Jun. 14, 1988

Related U.S. Application Data

[63] Continuation of Ser. No. 907,679, Sep. 15, 1986, abandoned.

[30] Foreign Application Priority Data

Sep. 27, 1985 [JP] Japan .................. 60-213746

[51] Int. Cl.$^4$ .................................. G09G 3/36
[52] U.S. Cl. ........................ 340/784; 340/793
[58] Field of Search ............ 340/718, 719, 784, 793, 340/800, 801, 802; 350/331 R, 332; 358/56, 59, 236, 241, 230

[56] References Cited

U.S. PATENT DOCUMENTS

| | | |
|---|---|---|
| 4,021,607 | 5/1977 | Amano . |
| 4,031,541 | 6/1977 | Arisawa et al. .............. 358/56 |
| 4,447,812 | 5/1984 | Soneda et al. ............... 340/784 |
| 4,581,654 | 4/1986 | Kobayashi et al. . |
| 4,591,902 | 5/1986 | Masubuchi .................. 358/59 |
| 4,600,274 | 7/1986 | Morozumi ................... 340/784 |

FOREIGN PATENT DOCUMENTS 155221A 9/1985 United Kingdom .

OTHER PUBLICATIONS

Hitachi Seisakusho K.K.–Patents Abstracts of Japan, vol. 3, No. 117, Sep. 29, 1989, p. 92 E 141; & JP-a-54 94835 7/26/79.

Primary Examiner—David K. Moore
Assistant Examiner—Jeffery A. Brier
Attorney, Agent, or Firm—Frishauf, Holtz, Goodman & Woodward

[57] ABSTRACT

A signal electrode drive circuit for driving a liquid crystal display panel includes a latch circuit for latching a digitized video signal, a buffer, a graduation signal-forming circuit, an intensity modulation pulse-generating circuit, and an analog multiplexer. The latch circuit holds the video data only once during one horizontal scanning period until a next latch pulse M is generated, thus considerably reducing current dissipation.

3 Claims, 5 Drawing Sheets

FIG. 5
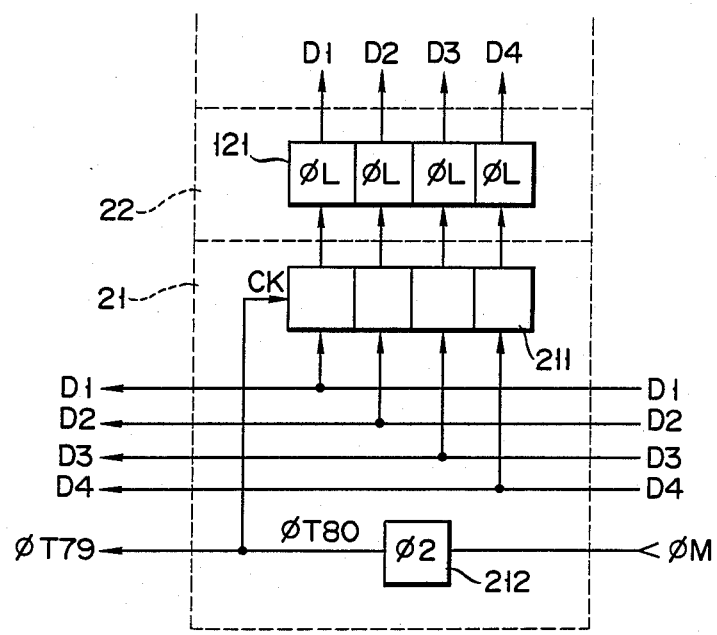
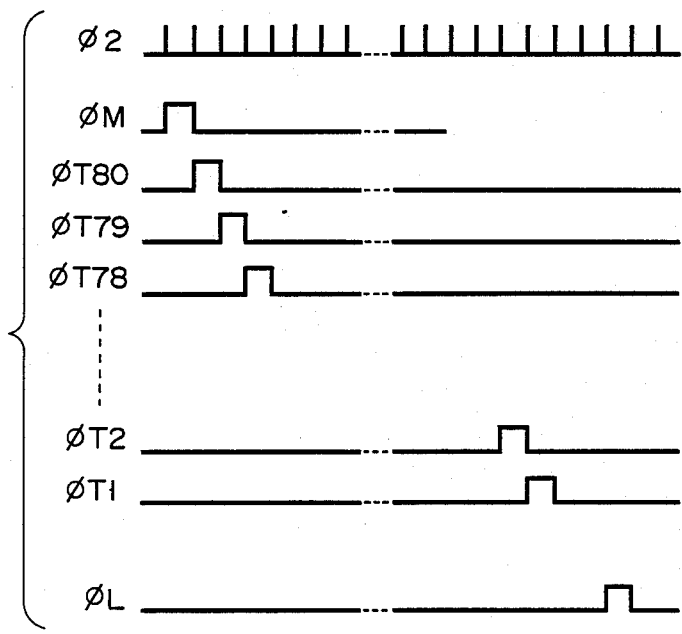
FIG. 6

APPARATUS AND METHOD FOR DRIVING SIGNAL ELECTRODES FOR LIQUID CRYSTAL DISPLAY DEVICES

This is continuation of application Ser. No. 907,679 filed Sept. 15, 1986 now abandoned.

BACKGROUND OF THE INVENTION

This invention relates to improvement of a signal electrode drive apparatus which is contained in the display-drive circuit for use in a liquid crystal display device.

A portable television employs a liquid crystal display device to provide its picture. An example of this known type of TV set is disclosed in U.S. Pat. No. 4,581,654. The display-drive circuit of this prior art TV set is configured as shown in FIGS. 1 through 3. FIG. 1 shows a configuration of the overall display-drive circuit. In the figure, reference numeral 1 designates a simple matrix liquid crystal display panel of, for example, 120×160 dots. Numeral 2 designates a scanning electrode drive circuit, and 3a and 3b denotes signal electrode drive circuits. Scanning electrode drive circuit 2 sequentially drives scanning electrodes X1 to X120 of display panel 1. The sequential drive operation is timed by a timing signal from a controller (not shown). Signal electrode drive circuits 3a and 3b drive groups of signal electrodes Y1 to Y80 and Y81 to Y160, respectively. The drive operation is performed using an n-bit digital signal, passed through an A/D converter, and a timing signal from the controller. More specifically, circuit 3a fetches the data of 80 lines, which comprise the left-hand portion of the input data record during the effective horizontal scanning period. Electrode drive circuit 3b fetches the data of 80 lines in the right-hand portion. On the basis of the fetched data, drive circuits 3a and 3b drive the respective groups of electrodes Y1 to Y80 and Y81 to Y160, in synchronism with the driving of scanning electrodes Xl to X120.

FIG. 2 shows in block diagraph the details of the prior art signal electrode drive circuit 3a. In the figure, shift register 11 is provided in each stage of 80 stages, and which consists of a 4-bit register. The 4-bit video data coming from an A/D converter (not shown) is sequentially stored in the the shift register, in synchronization with sampling clock $\phi s$. The data loaded is transferred to graduation signal-forming circuit 13, via buffer 12 which consists of 80 stages, each stage including 4-bit buffer registers, and which operates in synchronism with a latch pulse $\phi$.

Intensity modulation pulse-generating circuit 15 responds to latch pulse $\phi L$ and counts clock pulse $\phi 2$, to form intensity modulation pulses P1 to P4. These pulses P1 to P4 are input to graduation signal-forming circuit 13. Circuit 15 contains a counter, which is reset by latch pulse $\phi L$, and which frequency-divides, by 2, the frequency of clock pulse $\phi 2$, to form intensity modulation pulses P1 to P4. Clock pulse $\phi 2$ is a fundamental clock signal with a frequency of 3 MHz. Graduation signal-forming circuit 13 appropriately processes the 4-bit video data latched in buffer 12, and the intensity modulation pulses P1 to P4 generated by intensity modulation pulse-generating circuit 15, and forms 16 types of graduation signals S1 to S80 with different time widths. These graduation signals are transferred to 2-channel analog multiplexer 14. Multiplexer 14 also appropriately processes graduation signals S1 to S80 from graduation signal-forming circuit 13 and field-select signal $\phi f$, and forms signal electrode drive signals Y1 to Y80, to drive liquid crystal display panel 1.

FIG. 3 shows in detail one stage of the signal electrode drive circuit of FIG. 2 which consists of 80 stages, as previously stated. As is shown in shift register 11, each stage is made up of one register 111 of 4 bits, which is operated in response to sampling clock pulse $\phi s$. Data of 4 bits D1 to D4 coming from the A/D converter (not shown) are loaded into register 111; and then transferred to register 112, at the next stage. Buffer 12 includes a 4-bit buffer register 121 in each stage of 80 stages. The data from register 111 is loaded into buffer register 121 in synchronism with latch pulse $\phi L$. The data is then transferred to graduation signal-forming circuit 13. Graduation signal-forming circuit 13 consists of OR circuits 131 to 134, AND circuit 135, and flip-flop 136 to 138. The data from buffer register 121, together with intensity-modulation pulses P1 to P4 from modulation pulse-generating circuit 25, is input to AND circuit 135, via OR circuits 131 to 134. The output data from AND circuit 135 is input to flip-flop 136, in synchronism with clock pulse $\phi 2$. The output data of flip-flop 136 is input to the reset terminal R of flip-flop 137. Flip-flop 137 is set by latch pulse $\phi L$. Flip-flop 136 is reset by latch pulse $\phi L$. The output signal of flip-flop 137 is loaded into flip-flop 138, in synchronism with clock pulse $\phi 2$. The output signal from flip-flop 138 is transferred, as a graduation signal Si, to analog multiplexer 14. Multiplexer 14 is made up of decoder 141, and transfer gates 142 to 145. Multiplexer 14 receives a graduation signal Si and a frame-select signal $\phi f$. Transfer gates 142 to 145 are coupled with V5, V2, V3, and V0, respectively. These gates are gate-controlled by the output signal from decoder 141. By way of this gate control, one of voltages V5, V2, V3, and V0 is selected and output as a signal electrode drive signal Yi.

As can be seen from the foregoing, the signal electrode drive circuit is arranged such that each stage of shift register 11 is made up of a register 111. Shift register 11 in each stage of 80 stages contains register 111, 112, . . . , respectively, each of which transfers the video data of 4-bits. Register 111 is comprised of, for example, inverter including two transistors, and a clocked inverter including four transistors. The fact that the signal electrode drive circuit requires 80 stages for transferring video data at high speed, for example, 3 MHz which is the frequency of the fundamental clock signal, implies an increase in current dissipation in that drive circuit.

SUMMARY OF THE INVENTION

Accordingly, an object of this invention is to provide a signal electrode drive apparatus for use in a liquid crystal display, which requires a relatively small number of circuit elements for its circuit construction, and therefore consumes less current.

According to this invention, a signal electrode drive apparatus for use in a liquid crystal display comprises latch circuit means including m stages of shift registers and m buffer registers, one shift register in each stage successively shifting a latch pulse $\phi M$ in synchronism with fundamental clocks, to generate latch clocks $\phi T1$ to $\phi Tm$ with different phases, and each of the buffer registers latching in parallel fashion the n-bit video data in synchronism with the latch clocks $\phi T1$ to $\phi Tm$ output from the shift registers, the buffer registers of each stage being coupled with the video data, and means for generating signal electrode drive signals for a liquid crystal panel, by using the video data, latched in the buffer register at each stage.

With such an arrangement, the signal electrode drive apparatus according to this invention uses a latch circuit for transferring the high-speed data as the video data, in place of the shift register as employed by the prior art. The buffer register in this latch circuit latches the 4-bit video data once, in one horizontal scanning period, and holds it until the next latch pulse is generated. This feature reduces the current dissipation remarkably. The shift register, which is used in the latch circuit and which generates m latch clocks $\phi T1$ to $\phi Tm$ with different phases, by sequentially shifting the latch pulse M in synchronism with the fundamental clock pulse $\phi 2$, need only be capable of shifting one bit at each stage. This feature also further reduces the power dissipation from that of the prior art. Furthermore, the number of circuit elements used for forming the latch circuit is less than that for the prior art.

BRIEF DESCRIPTION OF THE DRAWINGS

FIG. 5 is a circuit diagram of a latch circuit and a buffer used in the circuit of FIG. 4;

FIG. 6 shows a timing chart for help in explaining the operation of the circuits of FIGS. 4 and 5;

DETAILED DESCRIPTION OF THE PREFERRED EMBODIMENTS

An embodiment of a signal electrode drive apparatus for use in a liquid crystal display according to this invention will now be described with reference to the accompanying drawings.

Figure 1:
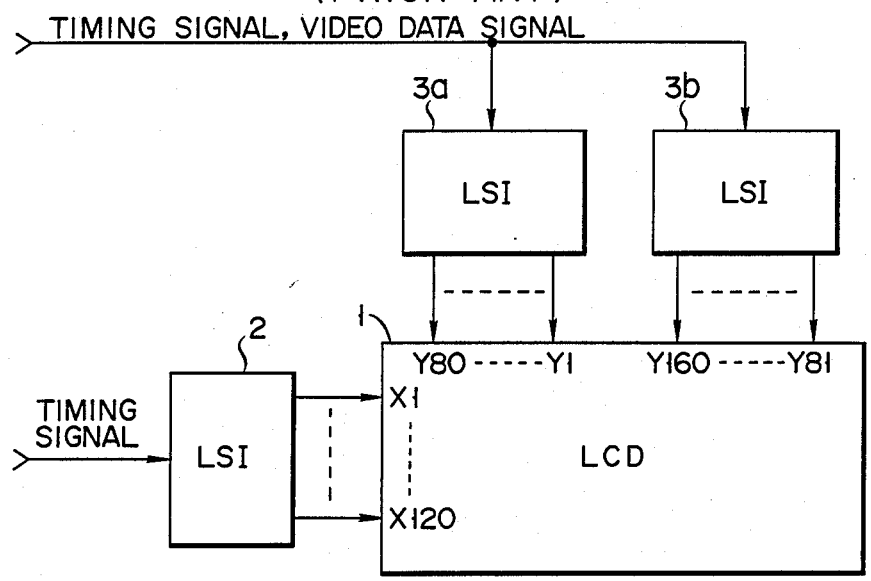
FIG. 1 shows a block diagram of a display drive circuit for use in a prior liquid crystal display, for example, a liquid crystal TV set.
Figure 2:
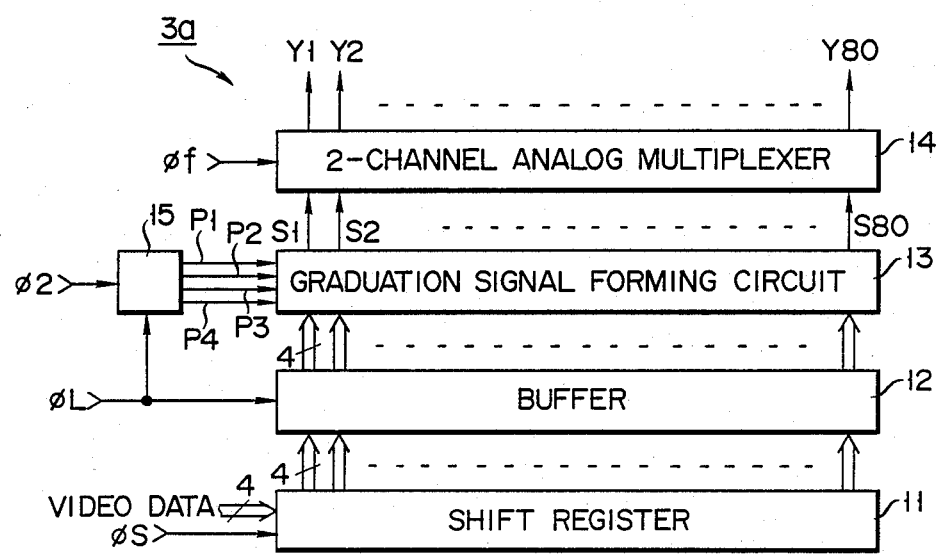
FIG. 2 shows a block diagram of a signal electrode drive circuit used in the display drive circuit of FIG. 1.
Figure 3:
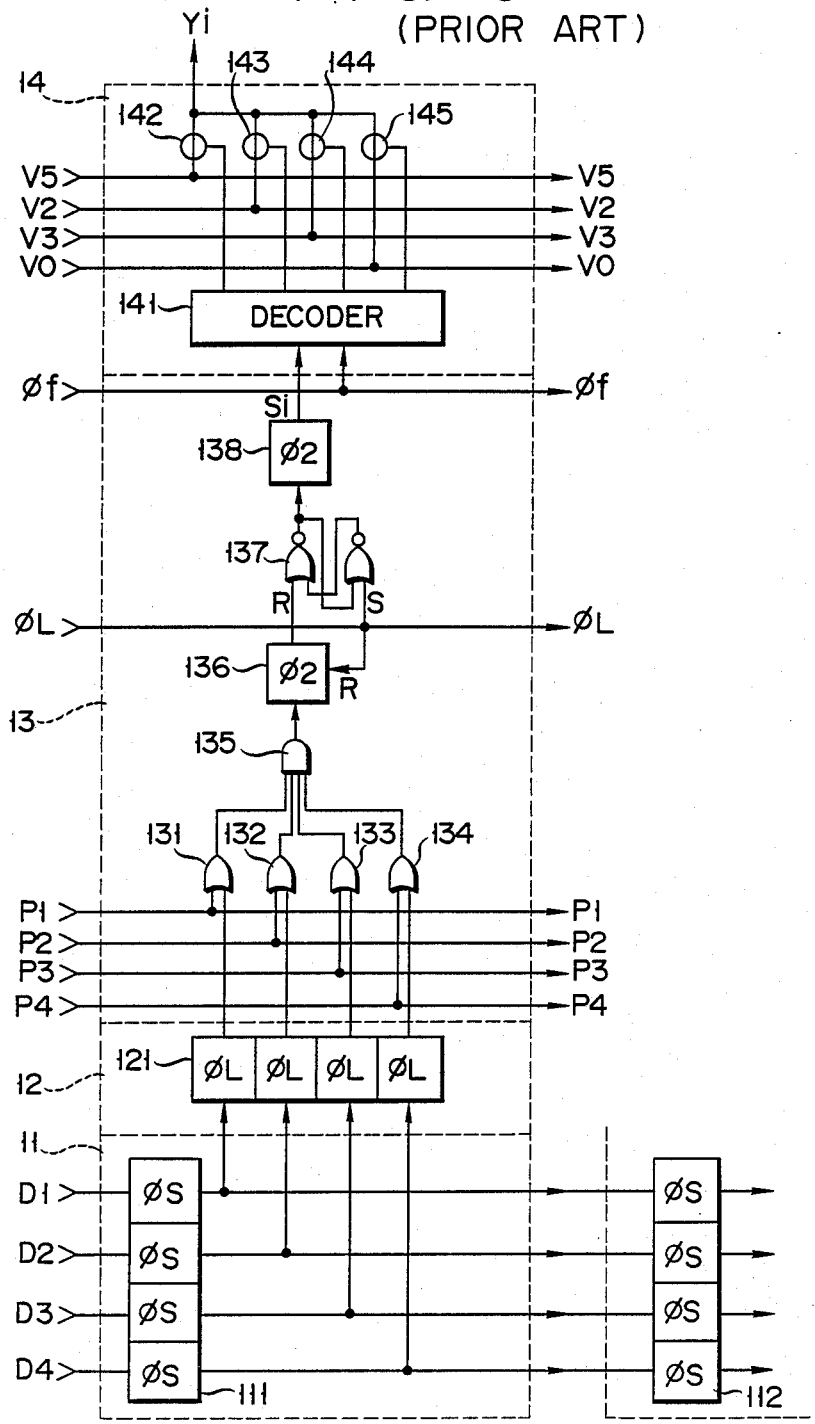
FIG. 3 shows a circuit diagram of one stage of the signal electrode drive circuit of FIG. 2.
Figure 4:
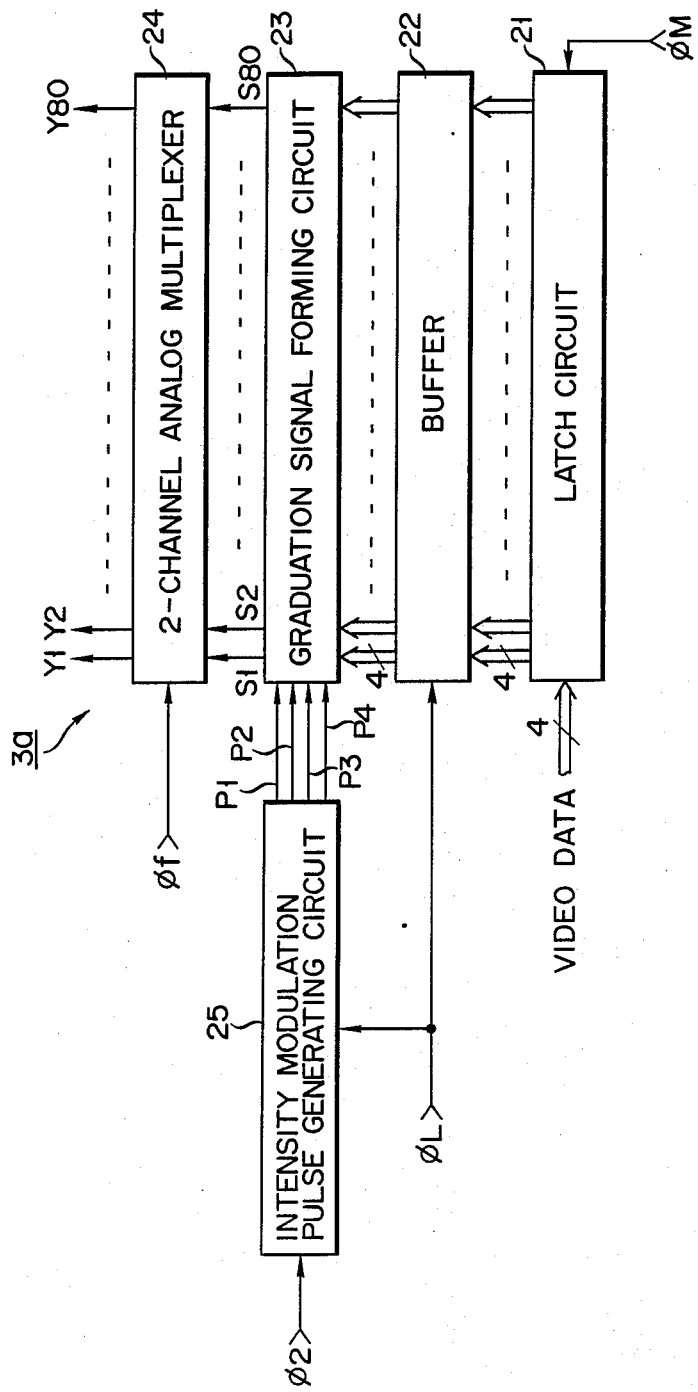
FIG. 4 is a block diagram of a signal electrode drive circuit according to one embodiment of this invention.

FIG. 4 shows a circuit configuration of the signal electrode drive circuit in a display drive circuit of the liquid crystal display. When this signal electrode drive circuit is applied to the display drive circuit shown in FIG. 1, it is used as the signal electrode drive circuit 3a. Reference numeral 21 designates a latch circuit made up of 80 stages. Applied to latch circuit 21 are 4-bit video data coming from an A/D converter (not shown) and latch pulse $\phi M$. Latch circuit 21 includes a shift register, which sequentially shifts latch pulse $\phi M$ from the timing signal-generating circuit In synchronism with the latch pulse as shifted by the shift register, the latch circuit latches the 4-bit video data, and outputs it to buffer 22. Latch circuit 21 shifts latch pulse $\phi M$ from the right stage to the left stage as shown in the drawing, i.e. from the portion connected to signal electrode drive signal Y80 to the portion connected to signal Y1. Latch circuit 21 will now be described in detail. In the description to follow, graduation signal-forming circuit 23 and analog multiplexer 24, succeeding buffer 22, will not be described in detail, since each of these circuits may have the same construction as those of the FIG. 3 circuit.

Referring now to FIG. 5, the circuitry shown in this figure corresponds to latch circuit 21 and buffer 22, which correspond to the signal electrode drive signal Y80. In latch circuit 21, reference numeral 211 indicates a 4-bit buffer register, and numeral 212 denotes a shift register. The buffer register 211 provided in each stage of latch circuit 21 is coupled with the 4-bit video data D1 to D4 coming from the A/D converter in parallel fashion. The video data are then loaded into the shift register 121 in buffer 22. Shift register 212 is also coupled with latch pulse $\phi M$. As shown in FIG. 6, shift register 212 fetches latch pulse $\phi M$ in synchronism with clock pulse $\phi 2$, and outputs it to the next shift register 212. More specifically, shift register 212 first fetches latch pulse $\phi M$ in synchronism with clock pulse $\phi 2$. Subsequently, the shift registers 212 in the subsequent stages successively produce latch clocks $\phi T80$ to $\phi T1$ in synchronism with clock pulse $\phi 2$. By means of these latch clocks, the 4-bit video data are successively latched into the buffer registers 211 in the respective stages. After these latching operations for the shift registers at all stages, latch pulse $\phi L$ is generated, and the video data held by buffer register 211 is transferred to buffer 22. The video data is then transferred to analog multiplexer 24 via graduation signal-forming circuit 23. Multiplexer 24 forms signal electrode drive signals Y1 to Y80, by using the graduation signal from circuit 23 and frame-select signal $\phi f$.

Figure 7A:
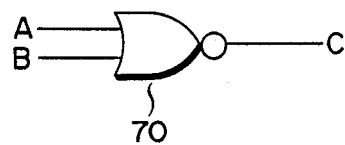
FIGS. 7A and 7B show a symbol of a circuit element used by the signal element drive circuit according to this invention, and its circuit diagram.
Figure 7B:
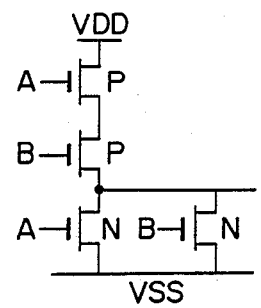
Figure 8:
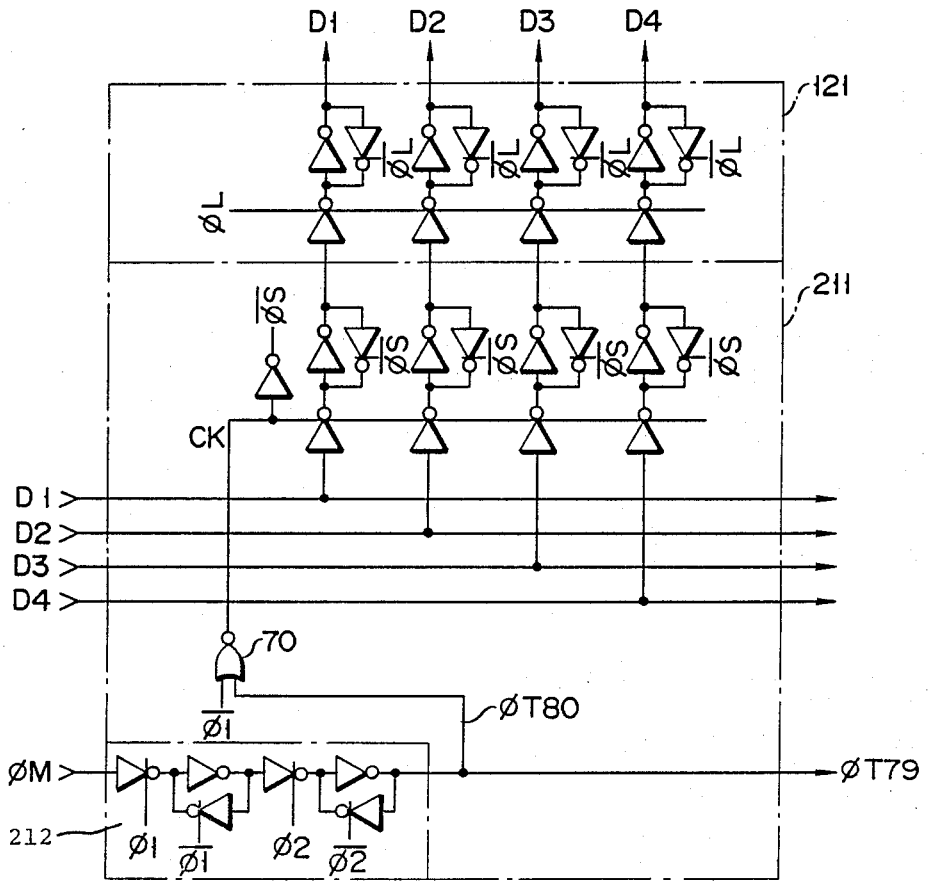
FIG. 8 shows a circuit diagram showing how to combine the circuit elements used in the circuit of FIG. 5.

A typical example of the circuit element of latch circuit 21 is symbolically illustrated in FIG. 7A. This circuit element of FIG. 7A is a NOR gate 70, which can be comprised of, for example, 4 MOS transistors combined, as shown in FIG. 7B. A CMOS inverter, which contains transistors combined, as shown in FIG. 8, may be used as shift register 212, buffer register 211 and shift register 212 in buffer 22. As shown in FIG. 8, read-in clock $\phi 1$ and read-out clock $\phi 2$ are supplied to shift-register 212. Using this arrangement, the number of inverters, particularly in buffer register 211, may be 12 for the 4-bit video data, while it is 24 in the prior device. As a result, power dissipation can also be reduced remarkably. Incidentally, latch pulses M and L and clock pulse $\phi 2$ shown in FIGS. 4 and 5, may be generated by the controller, as disclosed in U.S. Pat. No. 4,581,654.

What is claimed is;

1. An image display device including a signal electrode drive apparatus, comprising:
   (a) A/D converter means for sampling a video signal m times in accordance with a sampling clock within a period of an effective horizontal display and converting said video signal to n-bit digital data, where m is an integer;
   (b) latch circuit means including m stages of shift registers and m buffer registers;
   (c) one shift register in each stage for successively shifting a latch pulse in synchronism with reference clocks, to generate m latch clocks with different phases, and each of said buffer register being adapted for latching in parallel fashion said digital n-bit video data in synchronism with said latch clocks output from said shift registers, the buffer registers of each stage being coupled to receive said digital n-bit video data;
   (d) intensity modulation pulse generating circuit means for generating n kinds of intensity modulation pulses;

(e) m-stage logic circuit means arranged to receive said n kinds of intensity modulation pulses from said pulse generating circuit and said n-bit digital data from said buffer circuit, said logic circuit means producing gradation signals having $2^n$ kinds of pulse widths corresponding to said digital data;
(f) voltage selecting circuit means for decoding said gradation signals from said logic circuit means and for producing an output signal that varies with said gradation signals; and
(g) dot matrix liquid crystal display panel means of the twist nematic type and including a signal electrode arranged to be driven in response to an output signal from said voltage selecting circuit.

2. The signal electrode drive apparatus of claim 1, wherein said one shift register in each stage comprises a flip-flop supplied with a read-in clock and a read-out clock.

3. The signal electrode drive apparatus of claim 1, wherein said m buffer registers read said digital n-bit video data upon receipt of the latch clock which is output from said shift registers.

* * * * *

UNITED STATES PATENT AND TRADEMARK OFFICE
CERTIFICATE OF CORRECTION

PATENT NO. : 4,859,998

DATED : August 22, 1989

INVENTOR(S) : Kawamura et al

It is certified that error appears in the above-identified patent and that said Letters Patent is hereby corrected as shown below:

In the title page, column 1, after "Inventors", insert

--Assignee: Casio Computer Co., Ltd., Tokyo, Japan--

Signed and Sealed this

Eleventh Day of December, 1990

Attest:

HARRY F. MANBECK, JR.

Attesting Officer

Commissioner of Patents and Trademarks